(12) United States Patent
Yuan (10) Patent No.: US 9,852,510 B2
(45) Date of Patent: Dec. 26, 2017

(54) METHOD AND APPARATUS FOR DIVIDING IMAGE AREA

(71) Applicant: TENCENT TECHNOLOGY (SHENZHEN) COMPANY LIMITED, Shenzhen, Guangdong (CN)

(72) Inventor: Tonggen Yuan, Shenzhen (CN)

(73) Assignee: Tencent Technology (Shenzhen) Company Limited, Shenzhen, Guangdong (CN)

(*) Notice: Subject to any disclaimer, the term of this patent is extended or adjusted under 35 U.S.C. 154(b) by 0 days.

(21) Appl. No.: 15/039,702

(22) PCT Filed: Feb. 26, 2015

(86) PCT No.: PCT/CN2015/073285
§ 371 (c)(1),
(2) Date: May 26, 2016

(87) PCT Pub. No.: WO2015/131772
PCT Pub. Date: Sep. 11, 2015

(65) Prior Publication Data
US 2017/0249743 A1    Aug. 31, 2017

(30) Foreign Application Priority Data
Mar. 4, 2014   (CN) .......................... 2014 1 0077257

(51) Int. Cl.
G06T 5/00 (2006.01)
G06T 7/00 (2017.01)
G06T 7/11 (2017.01)

(52) U.S. Cl.
CPC ...... *G06T 7/11* (2017.01); *G06T 2207/20021* (2013.01)

(58) Field of Classification Search
CPC . G06T 5/002; G06T 5/20; G06T 2207/20012; G06T 2207/20021; G06T 7/136; H04N 5/357
See application file for complete search history.

(56) References Cited

U.S. PATENT DOCUMENTS 8,064,522 B2    11/2011  Kondo
8,314,890 B2    11/2012  Hosokawa
(Continued)

FOREIGN PATENT DOCUMENTS

CN    1926881 A     3/2007
CN    103426176 A   12/2013

OTHER PUBLICATIONS

International Search Report in international application No. PCT/CN2015/073285, dated May 22, 2015.
(Continued)

*Primary Examiner* — Michael Vanchy, Jr.
(74) *Attorney, Agent, or Firm* — Baker Hostetler LLP (57) ABSTRACT

A method and an apparatus for dividing an image area are provided. The method includes: a reading step: reading a pixel value of a current pixel and pixel values of multiple adjacent pixels adjacent to the current pixel in an image; a calculation step: calculating a difference between the pixel values of the current pixel and each adjacent pixel, so as to obtain a pixel difference value set, the pixel difference value set including multiple pixel difference values; a processing step: comparing each pixel difference value with a corresponding dynamic threshold in sequence, and determining all adjacent pixels in a same sub-image area as the current pixel, the current pixel and all the adjacent pixels of the current pixel in the same sub-image area constituting one sub-image area; and a traversal step: traversing each pixel in the image, and performing the reading step, the calculation step, and the processing step on each pixel in sequence, so
(Continued)

as to acquire multiple sub-image areas of the image. Therefore, a smooth area can be accurately divided from an image.

14 Claims, 5 Drawing Sheets

(56) References Cited

U.S. PATENT DOCUMENTS

| | | | |
|---|---|---|---|
| 2006/0285596 A1 | 12/2006 | Kondo | |
| 2011/0242418 A1* | 10/2011 | Hosokawa | G06T 5/003 348/576 |
| 2013/0044953 A1* | 2/2013 | Du | H04N 1/403 382/170 |

OTHER PUBLICATIONS

English Translation of the Written Opinion of the International Search Authority in international application No. PCT/CN2015/073285, dated May 22, 2015.

\* cited by examiner

METHOD AND APPARATUS FOR DIVIDING IMAGE AREA

CROSS-REFERENCE TO RELATED PATENT APPLICATIONS

The present application is a National Stage of International Patent Application No. PCT/CN2015/073285, filed Feb. 26, 2015, entitled "Method and Apparatus for Dividing Image Area" and claims the priority of Chinese Patent Application No. 201410077257.7, filed on Mar. 4, 2014, the disclosures of which are incorporated herein by reference in their entirety.

FIELD OF THE TECHNOLOGY

The present disclosure relates to the field of image processing, and in particular, relates to a method and an apparatus for dividing an image area.

BACKGROUND OF THE DISCLOSURE

In a method for dividing an image area in the existing technology, various differential operators may generally be used and a threshold method is further combined to find an area in an image. Specifically, in the method for dividing an image area by setting a threshold and further combining various differential operators, because generally such a method is relatively sensitive to noise in an image, a susceptibility to interference from noise in an image is high in a process of dividing a area; moreover, in the method, a fixed threshold is used, and therefore, when a manner of setting a threshold and further combining various differential operators is used to perform area division on an image, obtained image areas are relatively general, and levels among the image areas are unclear; meanwhile, a problem of segmenting an area having relatively smooth colors also cannot be solved.

In addition, a method of image area growing and area combination in the existing technology may further be used, and descriptions of adjacent areas are compared. For example, parameter descriptions such as average values and variances of two areas may be obtained from the statistics on a grayscale feature. If it is obtained through calculation that two areas match, the two areas are combined into one area, and an area parameter after combination is calculated again. If a calculation result is that two areas do not match, it is marked that the two areas do not match. The step is repeated until all sub-image areas of an image are acquired. In the solution, because a small area having an indistinct feature cannot be inhibited, a susceptibility to interference from noise is also very high. For example, for an area that is relatively smooth in an image of a face portion, area division may fail.

For a problem in related technologies that a smooth area cannot be accurately divided from an image because an image area having an indistinct feature cannot be inhibited, so far no effective solution has been proposed.

SUMMARY

Embodiments of the present invention provide a method and an apparatus for dividing an image area, so as to at least solve a technical problem that a smooth area cannot be accurately divided from an image because an image area having an indistinct feature cannot be inhibited.

According to an aspect of an embodiment of the present invention, a method for dividing an image area is provided, where the method includes: a reading step: reading a pixel value of a current pixel and pixel values of multiple adjacent pixels adjacent to the current pixel in an image; a calculation step: calculating a difference between the pixel values of the current pixel and each adjacent pixel, so as to obtain a pixel difference value set, the pixel difference value set including multiple pixel difference values; a processing step: comparing each pixel difference value with a corresponding dynamic threshold in sequence, and determining all adjacent pixels in a same sub-image area as the current pixel, the current pixel and all the adjacent pixels of the current pixel in the same sub-image area constituting one sub-image area; and a traversal step: traversing each pixel in the image, and performing the reading step, the calculation step, and the processing step on each pixel in sequence, so as to acquire multiple sub-image areas of the image.

According to another aspect of an embodiment of the present invention, an apparatus for dividing an image area is further provided, where the apparatus includes: a reading module, configured to read a pixel value of a current pixel and pixel values of multiple adjacent pixels adjacent to the current pixel in an image; a calculation module, configured to calculate a difference between the pixel values of the current pixel and each adjacent pixel, so as to obtain a pixel difference value set, the pixel difference value set including multiple pixel difference values; a processing module, configured to compare each pixel difference value with a corresponding dynamic threshold in sequence, and determine all adjacent pixels in a same sub-image area as the current pixel, the current pixel and all the adjacent pixels of the current pixel in the same sub-image area constituting one sub-image area; and a traversal module, configured to traverse each pixel in the image, and perform steps of the reading module, the calculation module, and the processing module on each pixel in sequence, so as to acquire multiple sub-image areas of the image.

In the embodiments of the present invention, a manner is used, and includes: a reading step: reading a pixel value of a current pixel and pixel values of multiple adjacent pixels adjacent to the current pixel in an image; a calculation step: calculating a difference between the pixel values of the current pixel and each adjacent pixel, so as to obtain a pixel difference value set, the pixel difference value set including multiple pixel difference values; a processing step: comparing each pixel difference value with a corresponding dynamic threshold in sequence, and determining all adjacent pixels in a same sub-image area as the current pixel, the current pixel and all the adjacent pixels of the current pixel in the same sub-image area constituting one sub-image area; and a traversal step: traversing each pixel in the image, and performing the reading step, the calculation step, and the processing step on each pixel in sequence, so as to acquire multiple sub-image areas of the image. Pixel values of a current pixel and a random number of adjacent pixels adjacent to the current pixel in an image are read to obtain through calculation a pixel difference value between the current pixel and each adjacent pixel. In a process of determining a sub-image area by comparing a pixel difference value and a threshold, the threshold changes dynamically, that is, each pixel difference value corresponds to one threshold, and each pixel difference value corresponds to a different threshold. Because a specific dynamic threshold is selected for each pixel difference value to perform comparison and calculation, distinctiveness between the current pixel and an adjacent pixel becomes clearer, thereby solving a technical problem that a smooth area cannot be accurately divided from an image because an image area having an indistinct feature cannot be inhibited, so as to achieve an objective of performing accurate division on an image to obtain a smooth area.

BRIEF DESCRIPTION OF THE DRAWINGS

The accompanying drawings shown herein are provided for further understanding of the present disclosure, and constitute a part of this application, and the exemplary embodiments of the present disclosure and its description are used for explaining the present disclosure, but do not constitute improper limitations to the present invention. In the accompanying drawings.

DESCRIPTION OF EMBODIMENTS

It should be noted that embodiments of this application and features in the embodiment can be combined with each other without causing any conflict. The present disclosure is described in detail below with reference to the accompanying drawings and the embodiments.

To make the solutions of the present disclosure clearer more comprehensible to persons skilled in the art, the following clearly and completely describes the technical solutions in the embodiments of the present invention with reference to the accompanying drawings in the embodiments of the present invention. Apparently, the described embodiments are some of the embodiments of the present invention rather than all of the embodiments. All other embodiments obtained by a person of ordinary skill in the art based on the embodiments of the present invention without creative efforts shall fall within the protection scope of the present invention.

It should be noted that the terms "first" and "second" in the specification, the claims, and the accompanying drawings of the present disclosure are used only to distinguish similar objects, and do not describe a specific relationship or sequence there between. It is to be understood that the terms so used are interchangeable under appropriate circumstances such that the embodiments of the present invention described herein can be implemented in sequences other than those illustrated or otherwise described herein. Moreover, the terms "include", "comprise", and any variants thereof are intended to cover a non-exclusive inclusion, such that a process, method, system, product, or device that includes a series of steps or units is not necessarily limited to those steps and units expressly listed, but may include other steps or units not expressly listed or inherent to such process, method, product, or device.

Embodiment 1

According to the embodiment of the present invention, a method embodiment that can be used to implement an apparatus embodiment of this application can be provided. It should be noted that the steps illustrated in the flow charts in the accompanying drawings can be carried out in a computer system in which a group of computers can execute instructions. Although the logical order of the steps is shown in the flow charts, the illustrated or described steps may be carried out in a different order in some cases.

Figure 1:
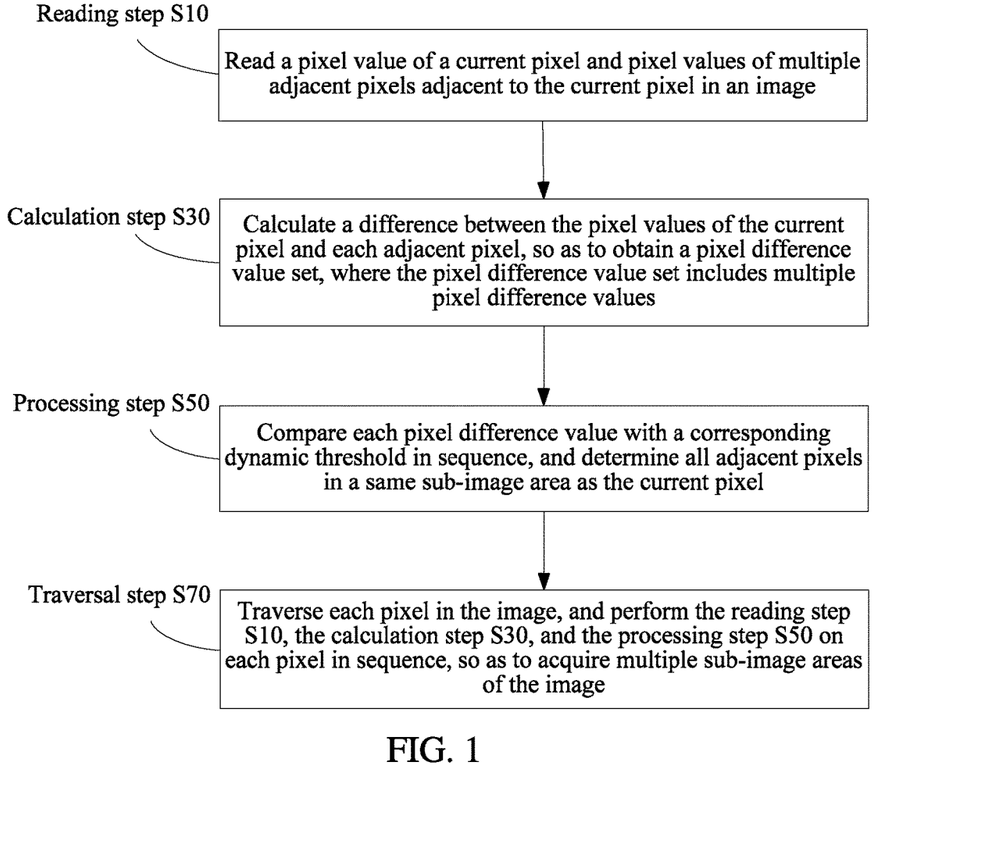
FIG. 1 is a flowchart of a method for dividing an image area according to Embodiment 1 of the present invention.
Figure 2:
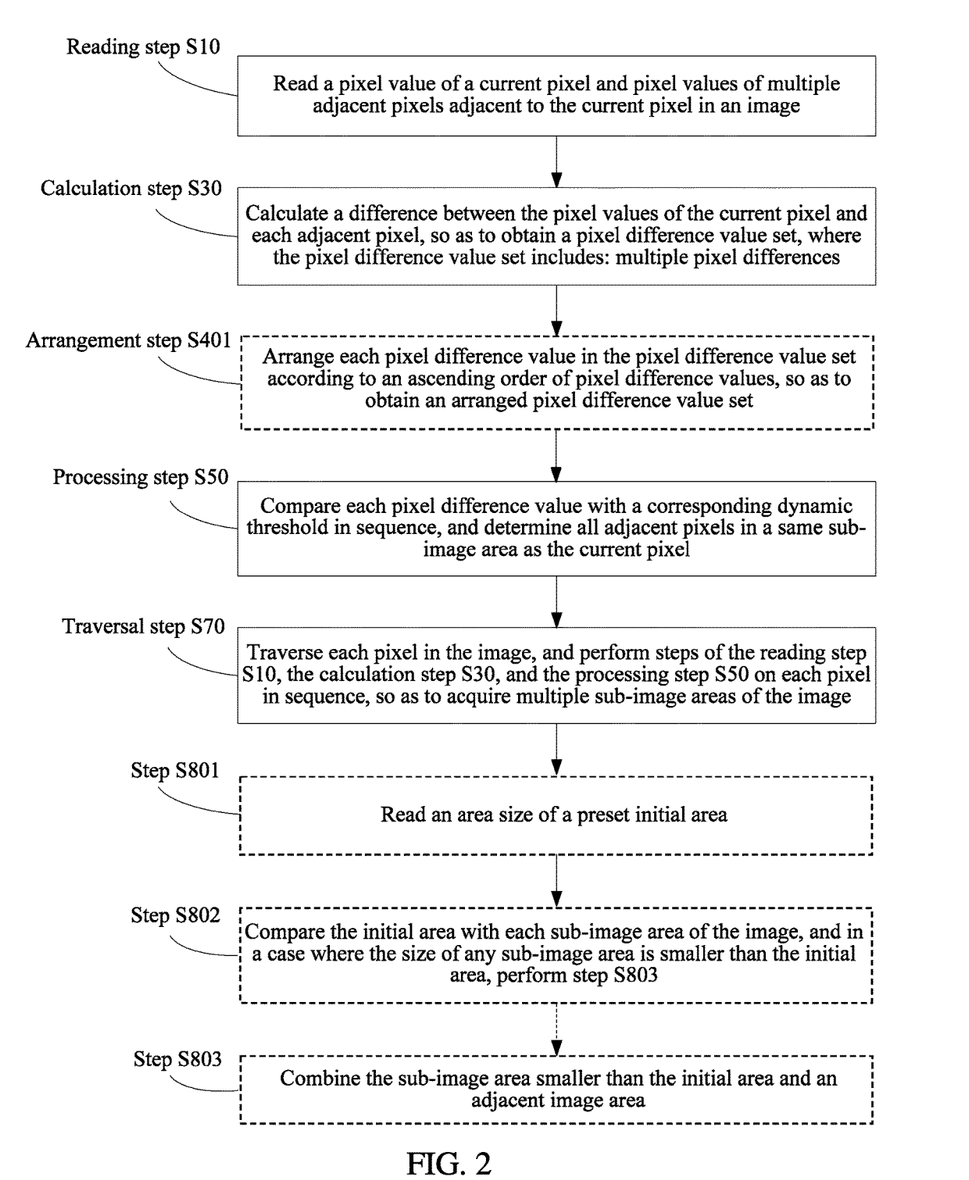
FIG. 2 is a detailed flowchart of an optional method for dividing an image area according to Embodiment 1 of the present invention.

FIG. 1 is a flowchart of a method for dividing an image area according to Embodiment 1 of the present invention; FIG. 2 is a detailed flowchart of an optional method for dividing an image area according to Embodiment 1 of the present invention.

According to an embodiment of the present invention, a method for dividing an image area is provided. As shown in FIG. 1, the method may include the following steps:

A reading step S10: Read a pixel value of a current pixel and pixel values of multiple adjacent pixels adjacent to the current pixel in an image.

A calculation step S30: Calculate a difference between the pixel values of the current pixel and each adjacent pixel, so as to obtain a pixel difference value set, where the pixel difference value set includes multiple pixel difference values.

A processing step S50: Compare each pixel difference value with a corresponding dynamic threshold in sequence, and determine all adjacent pixels in a same sub-image area as the current pixel, where the current pixel and all the adjacent pixels of the current pixel in the same sub-image area constitute one sub-image area.

A traversal step S70: Traverse each pixel in the image, and perform the reading step S10, the calculation step S30, and the processing step S50 on each pixel in sequence, so as to acquire multiple sub-image areas of the image.

In Embodiment 1 of this application, pixel values of a current pixel and a random number of adjacent pixels adjacent to the current pixel in an image are read to obtain through calculation a pixel difference value between the current pixel and each adjacent pixel. In a process of determining a sub-image area by comparing a pixel difference value and a threshold, the threshold changes dynamically, that is, each pixel difference value corresponds to one threshold, and each pixel difference value corresponds to a different threshold. Because a specific dynamic threshold is selected for each pixel difference value to perform comparison and calculation, distinctiveness between the current pixel and an adjacent pixel becomes clearer, thereby solving a technical problem that a smooth area cannot be accurately divided from an image because an image area having an indistinct feature cannot be inhibited, so as to achieve an objective of performing accurate division on an image to obtain a smooth area.

Specifically, the current pixel in the embodiment of this application may be a first pixel or any pixel of the image, and generally, the first pixel on the image is used as an initial pixel to traverse the entire image, so as to acquire the multiple sub-image areas, where pixels in each sub-image area belong to a same area.

In the embodiment, the number and positions of multiple adjacent pixels in step S10 may be randomly set according to a need. For example, 4 adjacent pixels x1, x2, x3, and x4 on the right, upper right, and lower right of and under a current pixel p may be obtained. After a current pixel and 4 adjacent pixels adjacent to the current pixel are acquired, differences between the pixel value of the current pixel and the pixel values of the 4 adjacent pixels may be calculated by using the calculation step S30, so as to obtain 4 pixel difference values w1, w2, w3, and w4, where w1 is the pixel difference value between the current pixel p and the first adjacent pixel x1, w2 is the pixel difference value between the current pixel p and the first adjacent pixel x2, w3 is the pixel difference value between the current pixel p and the first adjacent pixel x3, and w4 is the pixel difference value between the current pixel p and the first adjacent pixel x4. Meanwhile, coordinate positions of the 4 adjacent pixels are recorded.

In the embodiment of this application, as shown in FIG. 2, after the calculation step S30 of calculating a difference between the pixel values of the current pixel and each adjacent pixel, so as to obtain multiple pixel difference values, the method may further include the following steps:

An arrangement step S401: Arrange each pixel difference value in the pixel difference value set according to an ascending order of pixel difference values, so as to obtain an arranged pixel difference value set.

In the process of performing the processing step S50, the processing step S50 may be performed on the basis of the arranged pixel difference value set obtained in the arrangement step S401, in which each pixel difference value is compared with a corresponding threshold in sequence according to an arrangement order of the pixel difference values.

Specifically, in the embodiment of this application, the pixel difference values w between the current pixel and the adjacent pixels are arranged in an ascending order by using the arrangement step S401. For example, the 4 pixel difference values w1, w2, w3, and w4 in the pixel difference value set are arranged. By means of the arrangement, the pixel difference values w in the pixel difference value set are arranged in a gradually increasing form, and adjacent pixel difference values have a smallest difference. If a group of pixels corresponding to one adjacent pixel difference value is regarded as one small area, that is, the small area is constituted by two pixels, the arrangement of each pixel difference value may be regarded as combination of close small areas, and when a subsequent process of threshold comparison is performed, an area can be formed preferentially for a pixel combination having a smaller pixel difference value.

Figure 3:
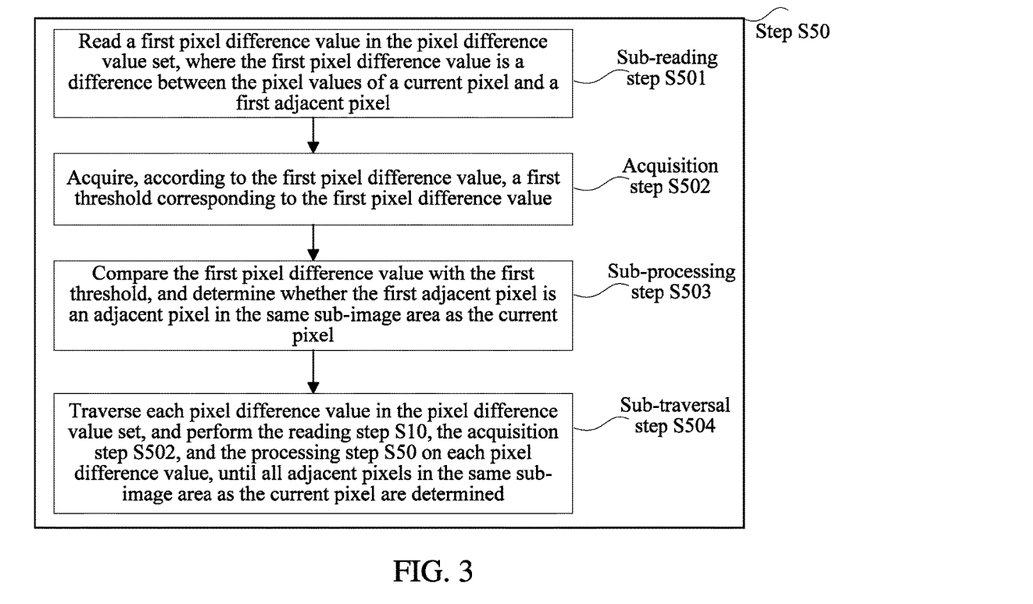
FIG. 3 is a detailed flowchart of another optional method for dividing an image area according to Embodiment 1 of the present invention.

In the embodiment of this application, as shown in FIG. 3, step S50 of comparing each pixel difference value with a corresponding dynamic threshold in sequence, and determining all adjacent pixels in a same sub-image area as the current pixel may include the following implementation steps:

A sub-reading step S501: Read a first pixel difference value in the pixel difference value set, where the first pixel difference value is a difference between the pixel values of the current pixel and a first adjacent pixel. Specifically, the first adjacent pixel in the step may be x1, and the first pixel difference value may be w1.

An acquisition step S502: Acquire, according to the first pixel difference value, a first threshold corresponding to the first pixel difference value.

A sub-processing step S503: Compare the first pixel difference value with the first threshold, and determine whether the first adjacent pixel is an adjacent pixel in the same sub-image area as the current pixel.

Steps S501 to S503 of this application implement that a system reads the first pixel difference value in the pixel difference value set, that is, reads a difference w1 between the pixel values of the current pixel and the first adjacent pixel, and compares w1 with the corresponding first threshold and determines whether the current pixel and the first adjacent pixel belong to a same image area.

A sub-traversal step S504: Traverse each pixel difference value in the pixel difference value set, and perform the reading step S10, the acquisition step S502, and the processing step S50 on each pixel difference value, until all adjacent pixels in the same sub-image area as the current pixel are determined. The traversal step S70 implements comparison between each pixel difference value in the pixel difference value set and a corresponding threshold, so as to acquire all the adjacent pixels in the same area as the current pixel.

Figure 4:
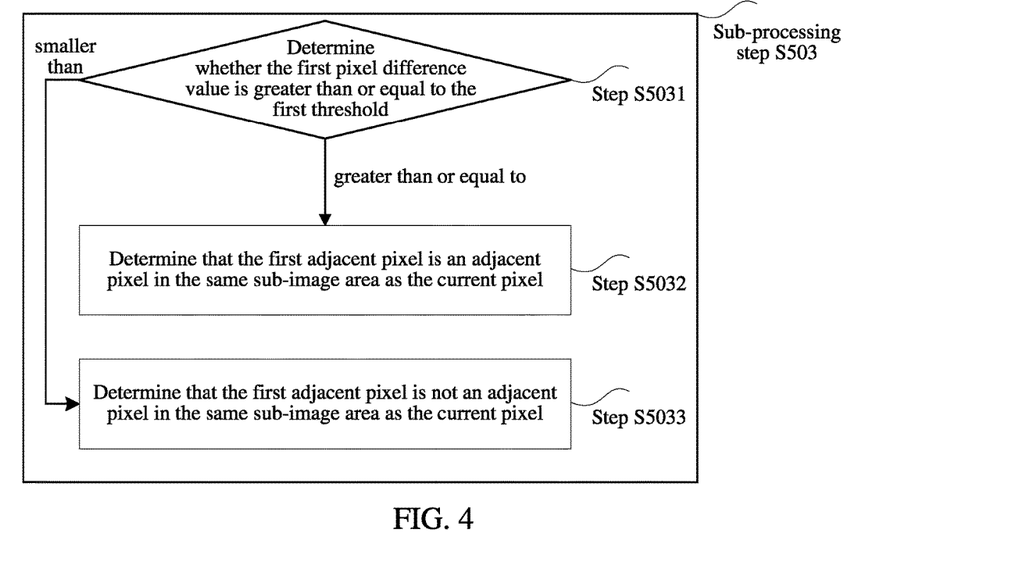
FIG. 4 is a detailed flowchart of still another optional method for dividing an image area according to Embodiment 1 of the present invention.

Preferably, in the embodiment of this application, as shown in FIG. 4, for the sub-processing step S503 of comparing the first pixel difference value with the first threshold, and determining whether the first adjacent pixel is an adjacent pixel in the same sub-image area as the current pixel, step S503 may include the following detailed steps:

Step S5031: Determine whether the first pixel difference value is greater than or equal to the first threshold, in a case where the first pixel difference value is greater than or equal to the first threshold, perform step S5032, and in a case where the first pixel difference value is smaller than the first threshold, perform step S5033.

Step S5032: Determine that the first adjacent pixel is an adjacent pixel in the same sub-image area as the current pixel.

Step S5033: Determine that the first adjacent pixel is not an adjacent pixel in the same sub-image area as the current pixel.

In step S5032, in a case where it is determined that the first adjacent pixel is an adjacent pixel in the same sub-image area as the current pixel, the current pixel may be marked as a feature pixel, where a pixel difference value corresponding to the feature pixel is the first pixel difference value.

Specifically, the embodiment implements that if a first pixel difference value w1 is greater than or equal to the first threshold, it may be determined that the current pixel and the first adjacent pixel are in a same area, or otherwise, they are not in a same area.

The 4 adjacent pixels are still used as an example. An implementation process of steps S501 to S503 and steps S5031 to step S5033 is as follows: After the difference w1 between the pixel values of the current pixel p and a first adjacent pixel x1 is acquired, if w1 is greater than or equal to the first threshold, in this case, the current pixel p and the first adjacent pixel x1 belong to a same image area G1. In this case, by using the sub-traversal step S504, each pixel difference value in the pixel difference value set is traversed. For example, after it is determined that the current pixel p and the first adjacent pixel x1 belong to the same image area G1, a second pixel difference value w2 between the current pixel p and a second adjacent pixel x2 is read, and it is determined whether the second pixel difference value w2 is greater than or equal to a second threshold. Similarly, if the second pixel difference value w2 is greater than or equal to the second threshold, the current pixel p and the second adjacent pixel x2 also belong to a same image area. In this case, p, x1, and x2 all belong to the same image area G1. Similarly, it may be eventually determined by using the sub-traversal step S504 that the current pixel p and those adjacent pixels belong to the same image area G1.

It should be further noted that in a case where it is determined that the first adjacent pixel is an adjacent pixel in the same sub-image area as the current pixel, the current pixel may be marked as a feature pixel, that is, the current pixel p in the image area G1 is marked as a feature pixel of a current area, and in this case, a pixel difference value corresponding to the feature pixel is the first pixel difference value w1.

As can be seen, the solution implements that the reading step S501, the acquisition step S502, and the processing step S503 are performed on each pixel difference value, until all the adjacent pixels of the current pixel in the same sub-image area are determined. It is implemented by using the traversal step S70 that each pixel difference value in the pixel difference value set is compared with a corresponding threshold, so as to acquire all the adjacent pixels in the same area as the current pixel.

Preferably, in the embodiment of this application, before step S50 of comparing each pixel difference value with a corresponding dynamic threshold in sequence, and determining all adjacent pixels in a same sub-image area as the current pixel, the method may further include the following implementation steps:

Step S402: Acquire a dynamic threshold $Q_i$ by using a formula as follows: $Q_i = w_i + threshold/size\ i$, where $w_i$ is a pixel difference value of a feature pixel, threshold is a preset initial threshold, size i is the size of an image area constituted by the current pixel and an ith adjacent pixel, and i is a natural number.

It may be known on the basis of the calculation formula that a first threshold $Q_1$ in step S5031 may be acquired by using a calculation formula as follows: $Q_1 = w_1 + threshold/size_1$, where $w_1$ is the first pixel difference value, threshold is a preset initial threshold, and $size_1$ is the size of an image area constituted by the current pixel and the first adjacent pixel.

The solution implements a threshold generation mechanism of this application. In the embodiment of this application, a threshold with which each pixel difference value is compared is a dynamic threshold, that is, each threshold is correspondingly updated as a pixel difference value changes. Specifically, a new threshold of a current area is equal to a sum of a difference value w of a feature pixel of the current area and the preset initial threshold being divided by the size of the area (w+threshold/size). The preset initial threshold may be set according to experience; for example, the initial threshold may be 20.

Specifically, the 4 adjacent pixels are still used as an example. The first pixel difference value is a pixel difference between a current pixel p and a first adjacent pixel. In this case, a pixel difference value corresponding to a feature pixel (that is, the current pixel p) is the first pixel difference value w1, and therefore, the first threshold Q1 is: $Q_1 = w_1 + threshold/size_1$. In a case where w1 is greater than or equal to the first threshold Q1, the current pixel p and the first adjacent pixel x1 belong to the same image area G1. In this case, the second pixel difference value corresponding to a second threshold Q2: $Q_2 = w_2 + threshold/size_2$. In this case, because the second pixel difference value is a difference obtained from the current pixel and a second adjacent pixel, in this case, a feature pixel of a current area is still the current pixel p, and therefore, $w_2 = w_1$, where $size_2$ is constituted by the image area G1 and the second adjacent pixel. Further, if the second pixel difference value w2 is greater than or equal to the second threshold, the current pixel p and a second adjacent pixel x2 also belong to a same image area, that is, in this case, p, x1, and x2 all belong to the same image area G1. Similarly, a threshold corresponding to each pixel difference value may be obtained through calculation by using the formula $Q_i = w_i + threshold/size\ i$. As can be seen, in the solution provided in this application, a mechanism of generating a dynamic threshold is a process in which a threshold decreases as an area size increases, and a mechanism of generating a dynamic threshold for the number of times may reduce a threshold fluctuation in the area, so that pixels in the entire area are all relatively close to a feature pixel.

The formation of a relatively large area may be avoided as much as possible by using a relationship between a dynamic threshold and an area size, and in this way, more distinct area levels may be formed.

It should be further noted here that before the processing of dynamic threshold comparison is performed on each pixel difference value in the pixel difference value set, the arrangement step S401 of arranging each pixel difference value in the pixel difference value set according to an ascending order of pixel difference values, so as to obtain an arranged pixel difference value set is performed. An objective of the arrangement here includes: In an aspect, a fluctuation range of the dynamic threshold may be narrowed, so that a formed image area has a relatively small of fluctuation of a chromatic aberration, which is more sensible and genuine; in another aspect, the dynamic threshold may have a trend of decrementing in general cases, so that determined pixels in a same image area are more similar, and meanwhile a phenomenon of unclear levels of divided areas because an image is excessively smooth can be prevented.

As can be seen, in the solution, by means of analysis on an image gradient value and in combination with arrangement, a variable threshold, noise inhibition, formation of a feature area of an image, it is implemented that a problem of dividing a relatively smooth area may be solved by means of arrangement and an algorithm of a dynamic threshold; especially, in a process that the present disclosure is applied to human face recognition, the solution has an obvious effect in dividing a human face area.

Preferably, in the embodiment of this application, as shown in FIG. 2, after step S70 of acquiring multiple sub-image areas of the image, the method may further include the following steps:

Step S801: Read an area size of a preset initial area.

Step S802: Compare the initial area with each sub-image area of the image, and in a case where the size of any sub-image area is smaller than the initial area, perform step S803.

Step S803: Combine the sub-image area smaller than the initial area and an adjacent image area.

It is implemented in steps S801 to S803 that, a size of an initial area is preset, which may be a fixed area value, the sizes of the initial area and each sub-image area acquired in step S70 are compared, and a sub-image area smaller than the initial area is combined, so that the sub-image area smaller than the initial area and an adjacent image area are combined into a relatively large area. The solution can inhibit interference from noise. For example, when a sub-image area is noise, that is, the sub-image area is a very small area, the noise is combined into an adjacent image area, so that some areas having insufficiently distinct features in an image can be removed.

As can be seen, it may be implemented by using the steps that, a problem of noise interference can be desirably solved through combination of relatively small areas, and an area having an indistinct feature can also be desirably eliminated.

In conclusion, the embodiment of this application proposes a simple method for dividing an image area, the core of which is a method of generating a dynamic threshold and a concept of arranging difference values w. The solution is applicable to human face recognition, and may desirably solve a problem of unclear levels in division of a face portion area.

It should be noted that the foregoing method embodiments are illustrated as a series of action combinations for ease of description; however, a person skilled in the art should know that the present disclosure is not limited to the described order of actions, because based on the present disclosure, some steps may be performed in another order or at the same time. Next, a person skilled in the art should know that the embodiments described in the specification are all preferred embodiments, and the involved actions and modules are not necessarily required in the present disclosure.

Through the above description of the implementation, it is clear to persons skilled in the art that the method according to the embodiment may be accomplished through software plus a necessary universal hardware platform, or certainly may also be accomplished through hardware; however, in many cases, the former is a preferred implementation manner. Based on this, the above technical solution of the present disclosure or the part that makes contributions to the prior art can be substantially embodied in the form of a software product. The computer software product may be stored in a storage medium (for example, a ROM/RAM, a magnetic disk, or an optical disc) and contain several instructions to instruct a terminal device (for example, a mobile phone, a computer, a server, or a network device) to perform the method described in the embodiments of the present disclosure.

Embodiment 2

Before further details of the embodiments of this application are described, a suitable computing architecture that can be configured to implement the principle of this application will be described with reference to FIG. 5. In the following description, unless otherwise indicated, the embodiments of this application will be described with reference to symbol representations of actions and operations performed by one or more computers. Therefore, it may be understood that the so-called type of actions and operations performed by a computer sometimes include manipulation of electric signals by a processing unit of the computer, where the electric signals represent data in a structural form. Such manipulation converts data or maintains data at a location in a memory system of the computer, which reconfigures or changes operations of a computer in a manner comprehensible to a person skilled in the art. A data structure for maintaining data is a physical location that is in a memory and has a specific attribute defined in the format of the data. However, although this application is described in the context, this application is not limitative, and as understood by a person skilled in the art, the aspects of actions and operations described hereinafter may also be implemented by using hardware.

Figure 5:
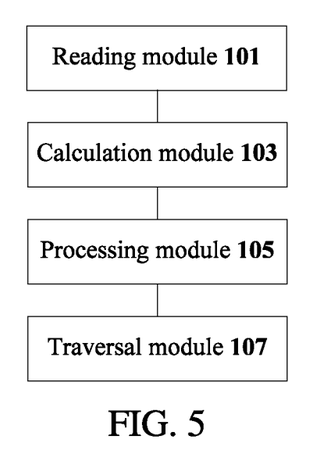
FIG. 5 is a schematic structural diagram of an apparatus for dividing an image area according to Embodiment 1 of the present invention.

In a most basic configuration of the embodiment, FIG. 5 is a schematic structural diagram of an apparatus for dividing an image area according to Embodiment 1 of the present invention. For the purpose of description, the drawn architecture is only one example of a suitable environment, and does not constitute any limitation on the use range or functions of this application. The computing system also should not be construed as having any dependence on or requirement for any components or a combination thereof shown in FIG. 5.

According to an embodiment of the present invention, an apparatus embodiment for implementing the method embodiment is further provided.

Figure 6:
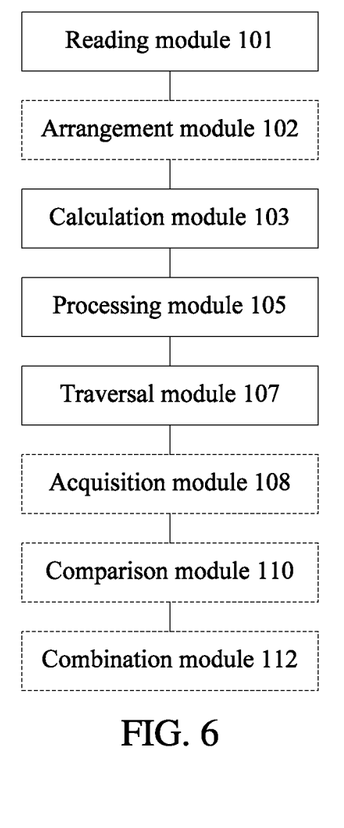
FIG. 6 is a schematic structural diagram of an optional apparatus for dividing an image area according to Embodiment 1 of the present invention.
Figure 7:
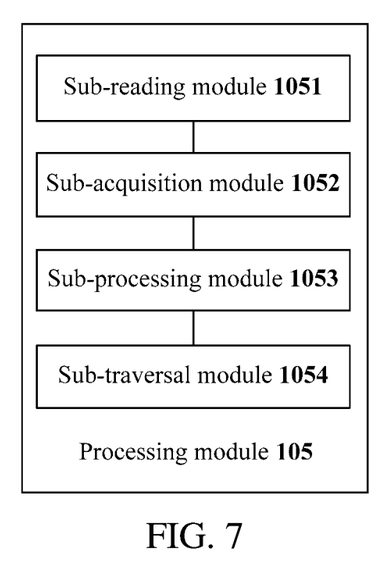
FIG. 7 is a schematic structural diagram of another optional apparatus for dividing an image area according to Embodiment 1 of the present invention.
Figure 8:
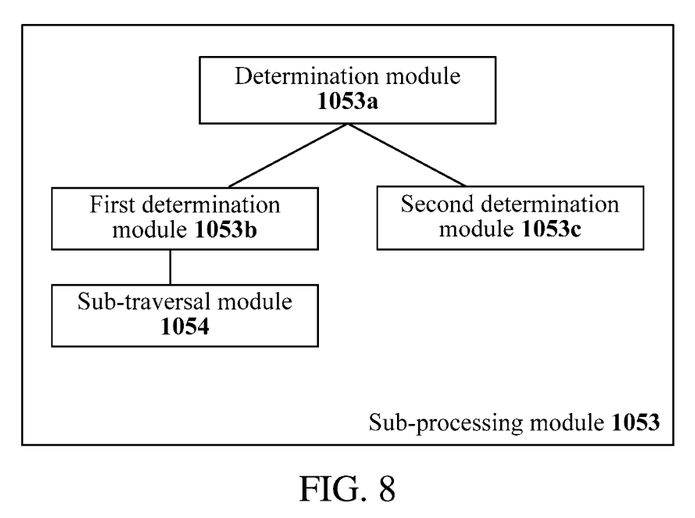
FIG. 8 is a schematic structural diagram of still another optional apparatus for dividing an image area according to Embodiment 1 of the present invention.

FIG. 5 is a schematic structural diagram of an apparatus for dividing an image area according to Embodiment 1 of the present invention; FIG. 6 is a schematic structural diagram of an optional apparatus for dividing an image area according to Embodiment 1 of the present invention; FIG. 7 is a schematic structural diagram of another optional apparatus for dividing an image area according to Embodiment 1 of the present invention; and FIG. 8 is a schematic structural diagram of still another optional apparatus for dividing an image area according to Embodiment 1 of the present invention.

As shown in FIG. 5, the apparatus includes: a reading module 101, a calculation module 103, a processing module 105, and a traversal module 107.

The reading module 101 is configured to read a pixel value of a current pixel and pixel values of multiple adjacent pixels adjacent to the current pixel in an image.

The calculation module 103 is configured to calculate a difference between the pixel values of the current pixel and each adjacent pixel, so as to obtain a pixel difference value set, where the pixel difference value set includes multiple pixel difference values.

The processing module 105 is configured to compare each pixel difference value with a corresponding dynamic threshold in sequence, and determine all adjacent pixels in a same sub-image area as the current pixel, where the current pixel and all the adjacent pixels of the current pixel in the same sub-image area constitute one sub-image area.

The traversal module 107 is configured to traverse each pixel in the image, and perform steps of the reading module, the calculation module, and the processing module on each pixel in sequence, so as to acquire multiple sub-image areas of the image.

In Embodiment 2 of this application, pixel values of a current pixel and a random number of adjacent pixels adjacent to the current pixel in an image are read to obtain through calculation a pixel difference value between the current pixel and each adjacent pixel. In a process of determining a sub-image area by comparing a pixel difference value and a threshold, the threshold changes dynamically, that is, each pixel difference value corresponds to one threshold, and each pixel difference value corresponds to a different threshold. Because a specific dynamic threshold is selected for each pixel difference value to perform comparison and calculation, distinctiveness between the current pixel and an adjacent pixel becomes clearer, thereby solving a technical problem that a smooth area cannot be accurately divided from an image because an image area having an indistinct feature cannot be inhibited, so as to achieve an objective of performing accurate division on an image to obtain a smooth area.

Specifically, the current pixel in the embodiment of this application may be a first pixel or any pixel of the image, and generally, the first pixel on the image is used as an initial pixel to traverse the entire image, so as to acquire the multiple sub-image areas, where pixels in each sub-image area belong to a same area.

In the embodiment, the number and positions of multiple adjacent pixels in the reading module 101 may be randomly set according to a need. For example, 4 adjacent pixels x1, x2, x3, and x4 on the right, upper right, and lower right of and under a current pixel p may be obtained. After a current pixel and 4 adjacent pixels adjacent to the current pixel are acquired, differences between the pixel value of the current pixel and the pixel values of the 4 adjacent pixels may be calculated by using the calculation step S30, so as to obtain 4 pixel difference values w1, w2, w3, and w4, where w1 is the pixel difference value between the current pixel p and the first adjacent pixel x1, w2 is the pixel difference value between the current pixel p and the first adjacent pixel x2, w3 is the pixel difference value between the current pixel p and the first adjacent pixel x3, and w4 is the pixel difference value between the current pixel p and the first adjacent pixel x4. Meanwhile, coordinate positions of the 4 adjacent pixels are recorded.

Preferably, in the embodiment of this application, as shown in FIG. 6, after the calculation module 103 completes calculation of a difference between the pixel values of the current pixel and each adjacent pixel, so as to obtain multiple pixel difference values, this application the apparatus may further run a module as follows, that is, the apparatus may further include: an arrangement module 102.

The arrangement module 102 is configured to arrange each pixel difference value in the pixel difference value set according to an ascending order of pixel difference values, so as to obtain an arranged pixel difference value set, and the processing module is further configured to compare each pixel difference value with a corresponding threshold in sequence according to an arrangement order of the pixel difference values.

Specifically, in the embodiment of this application, the pixel difference values w between the current pixel and the adjacent pixels are arranged in an ascending order by using the arrangement step S401. For example, the 4 pixel difference values w1, w2, w3, and w4 in the pixel difference value set are arranged. By means of the arrangement, the pixel difference values w in the pixel difference value set are arranged in a gradually increasing form, and adjacent pixel difference values have a smallest difference. If a group of pixels corresponding to one adjacent pixel difference value is regarded as one small area, that is, the small area is constituted by two pixels, the arrangement of each pixel difference value may be regarded as combination of close small areas, and when a subsequent process of threshold comparison is performed, an area can be formed preferentially for a pixel combination having a smaller pixel difference value.

As shown in FIG. 7, the processing module 105 in the embodiment of this application may include: a sub-reading module 1051, configured to read a first pixel difference value in the pixel difference value set, where the first pixel difference value is a difference between the pixel values of a current pixel and a first adjacent pixel; a sub-acquisition module 1052, configured to acquire, according to the first pixel difference value, a first threshold corresponding to the first pixel difference value; a sub-processing module 1053, configured to compare the first pixel difference value with the first threshold, and determine whether the first adjacent pixel is an adjacent pixel in the same sub-image area as the current pixel; and a sub-traversal module 1054, configured to traverse each pixel difference value in the pixel difference value set, and perform the reading step, the acquisition step, and the processing step on each pixel difference value, until all the adjacent pixels of the current pixel in the same sub-image area are determined.

Specifically, the sub-reading module 1051, the sub-acquisition module 1052, and the sub-processing module 1053 of this application implement that, a system reads the first pixel difference value in the pixel difference value set, that is, reads a difference w1 between the pixel values of the current pixel and the first adjacent pixel, and compares w1 with the corresponding first threshold and determines whether the current pixel and the first adjacent pixel belong to a same image area. Meanwhile, the sub-traversal module implements comparison between each pixel difference value in the pixel difference value set and a corresponding threshold, so as to acquire all the adjacent pixels in the same area as the current pixel.

Preferably, as shown in FIG. 8, the sub-processing module 1053 in the embodiment of this application may include: a determination module 1053a, configured to determine whether the first pixel difference value is greater than or equal to the first threshold; a first determination module 1053b, configured to determine, in a case where the first pixel difference value is greater than or equal to the first threshold, that the first adjacent pixel is an adjacent pixel in the same sub-image area as the current pixel; and a second determination module 1053c, configured to determine, in a case where the first pixel difference value is smaller than the first threshold, that the first adjacent pixel is not an adjacent pixel in the same sub-image area as the current pixel.

The apparatus further includes: a marking module 1054, configured to mark, in a case where it is determined that the first adjacent pixel is an adjacent pixel in the same sub-image area as the current pixel, the current pixel as a feature pixel, where a pixel difference value corresponding to the feature pixel is the first pixel difference value.

Specifically, the embodiment implements that, if a first pixel difference value w1 is greater than or equal to the first threshold, it may be determined that the current pixel and the first adjacent pixel are in a same area, or otherwise, they are not in a same area.

The 4 adjacent pixels are still used as an example. An implementation process of the sub-reading module, the sub-acquisition module, the sub-processing module, the determination module, the first determination module, and the second determination module is as follows: After the difference w1 between the pixel values of the current pixel p and a first adjacent pixel x1 is acquired, if w1 is greater than or equal to the first threshold, in this case, the current pixel p and the first adjacent pixel x1 belong to a same image area G1. In this case, by using the sub-traversal step S504, each pixel difference value in the pixel difference value set is traversed. For example, after it is determined that the current pixel p and the first adjacent pixel x1 belong to the same image area G1, a second pixel difference value w2 between the current pixel p and a second adjacent pixel x2 is read, and it is determined whether the second pixel difference value w2 is greater than or equal to a second threshold. Similarly, if the second pixel difference value w2 is greater than or equal to the second threshold, the current pixel p and the second adjacent pixel x2 also belong to a same image area. In this case, p, x1, and x2 all belong to the same image area G1. Similarly, the sub-traversal module may eventually determine that the current pixel p and those adjacent pixels belong to the same image area G1.

It should be further noted that in a case where it is determined that the first adjacent pixel is an adjacent pixel in the same sub-image area as the current pixel, the current pixel may be marked as a feature pixel, that is, the current pixel p in the image area G1 is marked as a feature pixel of a current area, and in this case, a pixel difference value corresponding to the feature pixel is the first pixel difference value w1.

As can be seen, the solution implements that steps of the sub-reading module, the sub-acquisition module, the sub-processing module are performed on each pixel difference value, until all the adjacent pixels of the current pixel in the same sub-image area are determined. The traversal module implements comparison between each pixel difference value in the pixel difference value set and a corresponding threshold, so as to acquire all the adjacent pixels in the same area as the current pixel.

In the embodiment of this application, before the processing module 105 compares each pixel difference value with a corresponding dynamic threshold in sequence, and determines all adjacent pixels in a same sub-image area as the current pixel, the apparatus may further include: a calculation and acquisition module.

The calculation and acquisition module is configured to acquire a dynamic threshold Qi by using a formula as follows: Qi=wi+threshold/size i, where w is a pixel difference value of a feature pixel, threshold is a preset initial threshold, size i is the size of an image area constituted by the current pixel and an ith adjacent pixel, and i is a natural number; where the calculation and acquisition module includes: a sub-calculation and acquisition module, configured to calculate a first threshold Q1: Q1=w1+threshold/size1, where w1 is the first pixel difference value, threshold is a preset initial threshold, and size1 is the size of an image area constituted by the current pixel and the first adjacent pixel.

The solution implements a threshold generation mechanism of this application. In the embodiment of this application, a threshold with which each pixel difference value is compared is a dynamic threshold, that is, each threshold is correspondingly updated as a pixel difference value changes. Specifically, a new threshold of a current area is equal to a sum of a difference value w of a feature pixel of the current area and the preset initial threshold being divided by the size of the area (w+threshold/size). The preset initial threshold may be set according to experience; for example, the initial threshold may be 20.

Specifically, the 4 adjacent pixels are still used as an example. The first pixel difference value is a pixel difference between a current pixel p and a first adjacent pixel. In this case, a pixel difference value corresponding to a feature pixel (that is, the current pixel p) is the first pixel difference value w1, and therefore, the first threshold Q1 is: Q1=w1+threshold/size1. In a case where w1 is greater than or equal to the first threshold Q1, the current pixel p and the first adjacent pixel x1 belong to the same image area G1. In this case, the second pixel difference value corresponding to a second threshold Q2: Q2=w2+threshold/size2. In this case, because the second pixel difference value is a difference obtained from the current pixel and a second adjacent pixel, in this case, a feature pixel of a current area is still the current pixel p, and therefore, w2=w1, where size2 is constituted by the image area G1 and the second adjacent pixel. Further, if the second pixel difference value w2 is greater than or equal to the second threshold, the current pixel p and a second adjacent pixel x2 also belong to a same image area, that is, in this case, p, x1, and x2 all belong to the same image area G1. Similarly, a threshold corresponding to each pixel difference value may be obtained through calculation by using the formula Qi=wi+threshold/size i. As can be seen, in the solution provided in this application, a mechanism of generating a dynamic threshold is a process in which a threshold decreases as an area size increases, and a mechanism of generating a dynamic threshold for the number of times may reduce a threshold fluctuation in the area, so that pixels in the entire area are all relatively close to a feature pixel.

The formation of a relatively large area may be avoided as much as possible by using a relationship between a dynamic threshold and an area size, and in this way, more distinct area levels may be formed.

It should be further noted here that before the processing of dynamic threshold comparison is performed on each pixel difference value in the pixel difference value set, the arrangement step S401 of arranging each pixel difference value in the pixel difference value set according to an ascending order of pixel difference values, so as to obtain an arranged pixel difference value set is performed. An objective of the arrangement here includes: In an aspect, a fluctuation range of the dynamic threshold may be narrowed, so that a formed image area has a relatively small of fluctuation of a chromatic aberration, which is more sensible and genuine; in another aspect, the dynamic threshold may have a trend of decrementing in general cases, so that determined pixels in a same image area are more similar, and meanwhile a phenomenon of unclear levels of divided areas because an image is excessively smooth can be prevented.

As can be seen, in the solution, by means of analysis on an image gradient value and in combination with arrangement, a variable threshold, noise inhibition, formation of a feature area of an image, it is implemented that a problem of dividing a relatively smooth area may be solved by means of arrangement and an algorithm of a dynamic threshold; especially, in a process that the present disclosure is applied to human face recognition, the solution has an obvious effect in dividing a human face area.

Preferably, in the embodiment of this application, as shown in FIG. 6, after the traversal module 107 acquires multiple sub-image areas of the image, the apparatus may further include: an acquisition module 108, configured to read an area size of a preset initial area; a comparison module 110, configured to compare the initial area with each sub-image area of the image; and a combination module 112, configured to combine, in a case where the size of any sub-image area is smaller than the initial area, the sub-image area smaller than the initial area and an adjacent image area.

The acquisition module 108, the comparison module 110, and the combination module 112 implement that, a size of an initial area is preset, which may be a fixed area value, the sizes of the initial area and each sub-image area acquired by the traversal module 107 are compared, and a sub-image area smaller than the initial area is combined, so that the sub-image area smaller than the initial area and an adjacent image area are combined into a relatively large area. The solution can inhibit interference from noise. For example, when a sub-image area is noise, that is, the sub-image area is a very small area, the noise is combined into an adjacent image area, so that some areas having insufficiently distinct features in an image can be removed.

As can be seen, it may be implemented by using the steps that, a problem of noise interference can be desirably solved through combination of relatively small areas, and an area having an indistinct feature can also be desirably eliminated.

As can be seen from the above description, the present disclosure achieves the following technical effects: A technical problem that a smooth area cannot be accurately divided from an image because an image area having an indistinct feature cannot be inhibited is solved, and an objective of performing accurate division on an image to obtain a smooth area is achieved.

The sequence numbers of the above embodiments of the present invention are merely for the convenience of description, and do not imply the preference among the embodiments.

In the embodiments of the present disclosure, the descriptions of the embodiments place different emphasis on different content, and for a part that is not detailed in an embodiment, reference can be made to the relevant descriptions of other embodiments.

In the embodiments provided by the present application, it should be understood that the clients disclosed may be implemented in other forms. The device embodiments described above are merely exemplary. For example, the division of units is merely logical functional division, and there are other division forms in real application. For example, multiple units or components may be combined or be integrated to another system, or some features may be ignored or not be executed. In another aspect, the coupling, direct coupling, or communication connection there between which is displayed or discussed may be indirect coupling or communication connection of interfaces, units, or modules, and may be electrical or in other forms.

Units described as separate components may be or may not be physically separated. Components shown as units may be or may not be physical units, that is, may be integrated or distributed to a plurality of network units. Some or all of the modules may be selected to achieve the objective of the solution of the embodiment according to actual demands.

In addition, the functional units in the embodiments of the present invention may either be integrated in a processing unit, or each be a separate physical unit; alternatively, two or more of the units are integrated in one unit. The integrated unit may be implemented in the form of hardware, or may be implemented in the form of a software functional unit.

If implemented in the form of software functional units and sold or used as an independent product, the integrated unit may also be stored in a computer readable storage medium. Based on this, the above technical solution or the part that makes contributions to the prior art can be substantially embodied in the form of a software product. The computer software product may be stored in a storage medium and contain several instructions to instruct computer equipment (for example, a personal computer, a server, or network equipment) to perform all or a part of the steps of the method described in the embodiments of the present invention. The storage medium may be any medium that is capable of storing program codes, such as a USB flash drive, a Read-Only Memory (ROM, Read-Only Memory), a RAM (RAM, Random Access Memory), a removable hard disk, a magnetic disk or an optical disk.

Only preferred embodiments of the present invention are described. It should be noted by persons of ordinary skill in the art that modifications and variations may be made without departing from the principle of the present disclosure, which should be construed as falling within the scope of the present disclosure.

What is claimed is:

1. A method for dividing an image area, comprising:
   a reading step: reading a pixel value of a current pixel and pixel values of multiple adjacent pixels adjacent to the current pixel in an image;
   a calculation step: calculating a difference between the pixel values of the current pixel and each adjacent pixel, so as to obtain a pixel difference value set, the pixel difference value set comprising multiple pixel difference values;
   a processing step: comparing each pixel difference value with a corresponding dynamic threshold in sequence, and determining all adjacent pixels in a same sub-image area as the current pixel, the current pixel and all the adjacent pixels of the current pixel in the same sub-image area constituting one sub-image area; and
   a traversal step: traversing each pixel in the image, and performing the reading step, the calculation step, and the processing step on each pixel in sequence, so as to acquire multiple sub-image areas of the image.

2. The method according to claim 1, wherein after the calculating a difference between the pixel values of the current pixel and each adjacent pixel, so as to obtain multiple pixel difference values, the method further comprises:
   arranging each pixel difference value in the pixel difference value set according to an ascending order of pixel difference values, so as to obtain an arranged pixel difference value set, wherein
   in a process of performing the processing step, each pixel difference value is compared with a corresponding threshold in sequence according to an arrangement order of the pixel difference values.

3. The method according to claim 2, wherein the step of comparing each pixel difference value with a corresponding dynamic threshold in sequence, and determining all adjacent pixels in a same sub-image area as the current pixel comprises:
   a sub-reading step: reading a first pixel difference value in the pixel difference value set, wherein the first pixel difference value is a difference between the pixel values of the current pixel and a first adjacent pixel;
   an acquisition step: acquiring, according to the first pixel difference value, a first threshold corresponding to the first pixel difference value;
   a sub-processing step: comparing the first pixel difference value with the first threshold, and determining whether the first adjacent pixel is an adjacent pixel in the same sub-image area as the current pixel; and
   a sub-traversal step: traversing each pixel difference value in the pixel difference value set, and performing the reading step, the acquisition step, and the processing step on each pixel difference value, until all the adjacent pixels of the current pixel in the same sub-image area are determined.

4. The method according to claim 1, wherein the step of comparing each pixel difference value with a corresponding dynamic threshold in sequence, and determining all adjacent pixels in a same sub-image area as the current pixel comprises:
   a sub-reading step: reading a first pixel difference value in the pixel difference value set, wherein the first pixel difference value is a difference between the pixel values of the current pixel and a first adjacent pixel;
   an acquisition step: acquiring, according to the first pixel difference value, a first threshold corresponding to the first pixel difference value;
   a sub-processing step: comparing the first pixel difference value with the first threshold, and determining whether the first adjacent pixel is an adjacent pixel in the same sub-image area as the current pixel; and a sub-traversal step: traversing each pixel difference value in the pixel difference value set, and performing the reading step, the acquisition step, and the processing step on each pixel difference value, until all the adjacent pixels of the current pixel in the same sub-image area are determined.

5. The method according to claim 4, wherein the step of comparing the first pixel difference value with the first threshold, and determining whether the first adjacent pixel is an adjacent pixel in the same sub-image area as the current pixel comprises:
   determining whether the first pixel difference value is greater than or equal to the first threshold;
   determining, in a case where the first pixel difference value is greater than or equal to the first threshold, that the first adjacent pixel is an adjacent pixel in the same sub-image area as the current pixel; and
   determining, in a case where the first pixel difference value is smaller than the first threshold, that the first adjacent pixel is not an adjacent pixel in the same sub-image area as the current pixel; and
   marking, in a case where it is determined that the first adjacent pixel is an adjacent pixel in the same sub-image area as the current pixel, the current pixel as a feature pixel, wherein a pixel difference value corresponding to the feature pixel is the first pixel difference value.

6. The method according to claim 5, wherein before the comparing each pixel difference value with a corresponding dynamic threshold in sequence, and determining all adjacent pixels in a same sub-image area as the current pixel, the method further comprises:
   acquiring a dynamic threshold Qi by using a formula as follows:
   Qi=wi+threshold/size i, wherein wi is the pixel difference value of the feature pixel, threshold is a preset initial threshold, size i is the size of an image area constituted by the current pixel and an ith adjacent pixel, and i is a natural number;
   wherein a first threshold Q1 is:
   Q1=w1+threshold/size1, wherein w1 is the first pixel difference value, threshold is a preset initial threshold, and size1 is the size of an image area constituted by the current pixel and the first adjacent pixel.

7. The method according to claim 1, wherein after the acquiring multiple sub-image areas of the image, the method further comprises:
   reading an area size of a preset initial area;
   comparing the initial area with each sub-image area of the image; and
   combining, in a case where the size of any sub-image area is smaller than the initial area, the sub-image area smaller than the initial area and an adjacent image area.

8. An apparatus for dividing an image area, comprising:
   a reading module, configured to read a pixel value of a current pixel and pixel values of multiple adjacent pixels adjacent to the current pixel in an image;
   a calculation module, configured to calculate a difference between the pixel values of the current pixel and each adjacent pixel, so as to obtain a pixel difference value set, the pixel difference value set comprising multiple pixel difference values;
   a processing module, configured to compare each pixel difference value with a corresponding dynamic threshold in sequence, and determine all adjacent pixels in a same sub-image area as the current pixel, the current pixel and all the adjacent pixels of the current pixel in the same sub-image area constituting one sub-image area; and
   a traversal module, configured to traverse each pixel in the image, and perform steps of the reading module, the calculation module, and the processing module on each pixel in sequence, so as to acquire multiple sub-image areas of the image.

9. The apparatus according to claim 8, wherein the apparatus further comprises:
   an arrangement module, configured to arrange each pixel difference value in the pixel difference value set according to an ascending order of pixel difference values, so as to obtain an arranged pixel difference value set, wherein
   the processing module is further configured to compare each pixel difference value with a corresponding threshold in sequence according to an arrangement order of the pixel difference values.

10. The apparatus according to claim 9, wherein the processing module comprises:
    a sub-reading module, configured to read a first pixel difference value in the pixel difference value set, wherein the first pixel difference value is a difference between the pixel values of the current pixel and a first adjacent pixel;
    a sub-acquisition module, configured to acquire, according to the first pixel difference value, a first threshold corresponding to the first pixel difference value;
    a sub-processing module, configured to compare the first pixel difference value with the first threshold, and determine whether the first adjacent pixel is an adjacent pixel in the same sub-image area as the current pixel; and
    a sub-traversal module, configured to traverse each pixel difference value in the pixel difference value set, and perform a reading step, an acquisition step, and a processing step on each pixel difference value, until all the adjacent pixels of the current pixel in the same sub-image area are determined.

11. The apparatus according to claim 8, wherein the processing module comprises:
    a sub-reading module, configured to read a first pixel difference value in the pixel difference value set, wherein the first pixel difference value is a difference between the pixel values of the current pixel and a first adjacent pixel;
    a sub-acquisition module, configured to acquire, according to the first pixel difference value, a first threshold corresponding to the first pixel difference value;
    a sub-processing module, configured to compare the first pixel difference value with the first threshold, and determine whether the first adjacent pixel is an adjacent pixel in the same sub-image area as the current pixel; and
    a sub-traversal module, configured to traverse each pixel difference value in the pixel difference value set, and perform a reading step, an acquisition step, and a processing step on each pixel difference value, until all the adjacent pixels of the current pixel in the same sub-image area are determined.

12. The apparatus according to claim 11, wherein the sub-processing module comprises:
    a determination module, configured to determine whether the first pixel difference value is greater than or equal to the first threshold;

a first determination module, configured to determine, in a case where the first pixel difference value is greater than or equal to the first threshold, that the first adjacent pixel is an adjacent pixel in the same sub-image area as the current pixel;

a second determination module, configured to determine, in a case where the first pixel difference value is smaller than the first threshold, that the first adjacent pixel is not an adjacent pixel in the same sub-image area as the current pixel; and a marking module, configured to mark, in a case where it is determined that the first adjacent pixel is an adjacent pixel in the same sub-image area as the current pixel, the current pixel as a feature pixel, wherein a pixel difference value corresponding to the feature pixel is the first pixel difference value.

13. The apparatus according to claim 12, further comprising:

a calculation and acquisition module, configured to acquire a dynamic threshold $Qi$ by using a formula as follows: $Qi=wi+threshold/size\ i$, wherein $wi$ is the pixel difference value of the feature pixel, threshold is a preset initial threshold, size i is the size of an image area constituted by the current pixel and an ith adjacent pixel, and i is a natural number;

wherein the calculation and acquisition module comprises: a sub-calculation and acquisition module, configured to calculate a first threshold $Q1$: $Q1=w1+threshold/size1$, wherein $w1$ is the first pixel difference value, threshold is a preset initial threshold, and size1 is the size of an image area constituted by the current pixel and the first adjacent pixel.

14. The apparatus according to claim 8, wherein the apparatus further comprises:

an acquisition module, configured to read an area size of a preset initial area;

a comparison module, configured to compare the initial area with each sub-image area of the image; and a combination module, configured to combine, in a case where the size of any sub-image area is smaller than the initial area, the sub-image area smaller than the initial area and an adjacent image area.

* * * * *